United States Patent [19]

Ryan

[11] Patent Number: 5,630,606
[45] Date of Patent: May 20, 1997

[54] TRAILER HITCH WITH EXTENSIBLE THROAT

[76] Inventor: John M. Ryan, 1515 Little Ave., Paducah, Ky. 42002

[21] Appl. No.: 493,988

[22] Filed: Jun. 23, 1995

[51] Int. Cl.⁶ .................................................. B60D 1/40
[52] U.S. Cl. ......................................................... 280/479.3
[58] Field of Search .............................. 280/477, 478.1, 280/479.2, 479.3, 482, 491.1, 491.2, 491.3

[56] References Cited

U.S. PATENT DOCUMENTS

| | | | |
|---|---|---|---|
| 2,845,281 | 7/1958 | Holder et al. | 280/479.3 |
| 2,871,029 | 1/1959 | Demarest | 280/479.3 X |
| 3,099,462 | 7/1963 | Lent | 280/479.3 |
| 3,622,182 | 11/1971 | Grosse-Rhode | 280/479.3 |
| 3,860,267 | 1/1975 | Lyons | 280/479.3 |
| 4,042,254 | 8/1977 | Allen | 280/479.3 |
| 4,073,508 | 2/1978 | George et al. | 280/478.1 |
| 4,114,921 | 9/1978 | Thorell et al. | 280/479.3 |
| 4,215,875 | 8/1980 | Younger | 280/479.3 |
| 4,515,387 | 5/1985 | Schuck | 280/479.3 |
| 4,744,583 | 5/1988 | Blackwood | 280/479.3 |
| 4,792,151 | 12/1988 | Feld | 280/406.2 |
| 4,807,899 | 2/1989 | Belcher | 280/477 |
| 4,883,285 | 11/1989 | Hohrman | 280/491.5 |
| 4,991,865 | 2/1991 | Francisco | 280/479.3 X |
| 5,184,840 | 2/1993 | Edwards | 280/507 |
| 5,201,539 | 4/1993 | Mayfield | 280/479.2 |
| 5,213,354 | 5/1993 | Vaughn | 280/479.2 |
| 5,236,214 | 8/1993 | Taylor | 280/402 |
| 5,277,447 | 1/1994 | Blaser | 280/479.2 |
| 5,288,095 | 2/1994 | Swindall | 280/479.2 |
| 5,322,315 | 6/1994 | Carsten | 280/479.2 |
| 5,342,076 | 8/1994 | Swindall | 280/479.3 X |

FOREIGN PATENT DOCUMENTS

| | | | |
|---|---|---|---|
| 586883 | 4/1947 | United Kingdom | 280/479.3 |
| 94/27835 | 12/1994 | WIPO | 280/479.3 |

*Primary Examiner*—Kevin Hurley
*Attorney, Agent, or Firm*—Richard C. Litman

[57] ABSTRACT

A ball and socket trailer hitch with a throat that is capable of automatically seating and locking a telescoping member capable of lateral swinging movement. The hitch allows a stationary towing vehicle having been imprecisely aligned with a stationary trailer to be coupled without realigning either the trailer or towing vehicle, and then, in one backing motion of the towing vehicle, automatically aligning and locking the hitch into a towing configuration. The preferred embodiment is made up of a frame, a frusto-pyramidally shaped throat, a matingly frusto-pyramidally shaped telescoping member to which a coupling structure which is accepted by the trailer is affixed, an elongated rail, a trunnion pivotally linking the rail to the throat, a locking-pin assembly, and a safety pin. The elongated rail is removably attached to the rear and narrowed portion of the throat by a removable trunnion, which permits the rail, which extends beyond the throat opening, to pivot laterally within the confines of the throat. The telescoping member is capable of being inserted into the throat and onto the rail, whereby the telescoping member may ride and provide the means by which the coupling structure can be extended and coupled with a mating trailer structure after having positioned the towing vehicle into a close proximity to the trailer.

9 Claims, 5 Drawing Sheets

TRAILER HITCH WITH EXTENSIBLE THROAT

BACKGROUND OF THE INVENTION

1. Field of the Invention

The present invention relates to a ball and socket trailer hitch with a throat that is capable of automatically seating and locking a telescoping member capable of lateral swinging movement. The hitch allows a stationary towing vehicle having been imprecisely aligned with a stationary trailer to be coupled without realigning either the trailer or towing vehicle, and then in one backing motion of the towing vehicle, automatically aligning and locking the hitch into a towing configuration.

2. Description of the Prior Art

Conventional ball and socket type trailer hitches are in common use for towing trailers behind passenger and light utility vehicles. However, the ability of a driver to back a towing vehicle trailer and align its hitch with a stationary trailer, so that the socket in the tongue of the trailer and the ball of the hitch align, approaches an art form. This ability is particularly desirable when the towing vehicle is operating under tight-radius circumstances or when no other person is available to direct the backing procedure.

The procedure of coupling a trailer and a towing vehicle typically requires that the towing vehicle be moved into close proximity with the trailer tongue so that the tongue of the trailer can be lowered down upon the ball of the hitch. Once the hitch is properly positioned, the socket of the tongue is lowered down upon the ball, secured and locked into a towing configuration. Numerous inventions can be found prior art using various structures in order to overcome the problems of aligning and locking the hitch assembly into place.

For example, U.S. Pat. No. 5,322,315 issued Jun. 21, 1994 to Carsten describes a towing hitch having a body with a pocket within which a receiver tube is permanently pivoted by a trunnion allowing an arcuate movement of the receiver bar in a 60 degree arc bounded by the pocket's walls. The receiver tube is also capable of telescopingly capturing a tow bar (on which a coupling ball is mounted). The hitch is locked into a towing position using two pin assemblies. This must be accomplished by a forward and backward movement of the towing vehicle relative to the trailer. When the towing vehicle pulls forward, the angle having been formed by the trailer and the towing vehicle decreases until the towing vehicle and trailer are in alignment at a zero angle. A first pin assembly then automatically locks the receiver tube to the body by engaging with a recess fixed in the body at the zero angle. A second pin assembly automatically is capable of locking the tow bar within the receiving tube. However, the tow bar is shown to extend in a direction only along the radius in which the receiving bar is positioned. Therefore, in order to retract the tow bar from an extended position, the vehicle must be first pulled forward to lock the first pin assembly, then backed straight back to retract the tow bar until the second pin assembly locks. Although the telescoping and laterally swinging nature of the device allows the towing vehicle and trailer to be coupled while only being moved into a close proximity, a great disadvantage of this system is that the vehicle must be maneuvered forward and back at least once before a safe towing configuration is achieved. Furthermore, any misalignment of the towing bar within the receiving tube may cause the bar to remain extended during the backing phase of the locking procedure.

U.S. Pat. No. 4,792,151 issued Dec. 20, 1988 to Feld also describes a self-aligning, self-locking and self-leveling trailer hitch, which requires that a first assembly (a double-ended ball) be manually and securely fitted into the socket of the trailer. The towing vehicle is fitted with a second assembly, a downwardly sloping and outwardly flaring ramp with self-locking, interfitting dual-jaws, which jaws when closed receive the first assembly. The flared portion of the ramp must be backed into contact with the first assembly so that, while the towing vehicle continues to be backed, the first assembly is forced to travel up the incline into the jaws. A great disadvantage of this invention is that the towing vehicle must still be backed with near precision to bring the tongue of the trailer and the hitch into contact.

U.S. Pat. No. 4,073,508 issued Feb. 14, 1978 to George et al. describes an adjustable ball and socket type trailer hitch with a rotatable, extensible and hinged arm adapted to pivot on, extend from, and retract into a housing. The hitch is characterized by a folding outer and inner arm capable of extending from and folding into a housing whereby the ball of the hitch can be maneuvered into substantially any position within the range of the extended outer arm after the towing vehicle is backed into close proximity to a trailer.

U.S. Pat. No. 4,807,899 issued Feb. 28, 1989 to Belcher describes a hitch with a winch, retractable cable and tubular receiving passage into which a tapered hitch bar is drawn in order to align the trailer and hitch. A plunger locking pin is used to secure the hitch bar and receiving passage to engage a towing configuration. U.S. Pat. No. 5,288,095 issued Feb. 22, 1994 to Swindall describes a simple device which is bolted by a base plate to the bumper of a towing vehicle. A tubular housing is attached to a base plate through a trunnion to permit arcuate movement. A slide bar with a ball is telescopingly captured by the housing in the same radius as the position of the housing. A spring loaded locking pin secures the slide bar in place.

Devices directed to applications which allow a trailer tongue to telescope and swivel, as contrasted to applications directed at the towing vehicle hitch, are also found in the prior art. U.S. Pat. No. 5,277,447 issued Jan. 11, 1994 to Blaser describes a retro-fit adaptor for use with commonly used two-part trailer hitches. The adaptor can be either interposed between and attached to a ball-supporting member and a supporting guide tube attached to the towing vehicle, or, interposed between and attached to the socket-supporting member and a supporting guide tube attached to the trailer. The adaptor is capable of both axial and lateral swinging movement for coupling of vehicles. The adaptor has angled faces which cam the supporting member and supporting guide tube into alignment as the towing vehicle is backed towards the trailer.

U.S. Pat. No. 5,213,354 issued May 2, 1993 to Vaughn is directed in application to a trailer and describes a tubular draw bar which is guided within walls of an elongate base member by a rolling pin. The base member is affixed to a triangular frame plate forming a part of the trailer.

None of the above inventions and patents, taken either singly or in combination, is seen to describe the instant invention as claimed.

SUMMARY OF THE INVENTION

The present invention relates to a ball and socket trailer hitch with a throat that is capable of automatically seating and locking a telescoping member capable of lateral swinging movement, The hitch allows a stationary towing vehicle having been imprecisely aligned with a stationary trailer to be coupled without realigning either the trailer or towing vehicle, and then in one backing motion of the towing vehicle, automatically aligning and locking the hitch into a towing configuration. The invented towing hitch addresses the disadvantages as identified above, such as limiting the amount of maneuvering before a locked towing configuration is achieved, as well as avoiding introduction of unnecessary complexity to the hitch's design and function.

The preferred embodiment is made up of a frame, a frusto-pyramidally shaped throat, a matingly frusto-pyramidally shaped telescoping member to which a coupling structure which is accepted by the trailer is affixed, an elongated rail, a trunnion pivotally linking the rail to the throat, a locking-pin assembly, and a safety pin. The frame secures the hitch to the chassis of a towing vehicle. The throat is permanently affixed to a central location on the frame so that the opening of the throat may face in the rearward direction of the towing vehicle toward a trailer. Within the throat, an elongated rail is removably attached to the rear and narrowed portion of the throat by a removable trunnion. This trunnion permits the rail, which extends beyond the throat opening, to pivot laterally within the confines of the throat. The telescoping member is capable of being inserted into the throat and onto the rail, whereby the telescoping member may ride and provide the means by which the coupling structure can be extended and coupled with a mating trailer structure after having positioned the towing vehicle into a close proximity to the trailer.

The central feature which contributes to the hitch's ability to self-align and automatically lock in a towing configuration is the V-shaped mating configuration which allows a contiguous engagement of the walls of telescoping member with the walls of the throat. First, the angle of the walls permit the telescoping member to physically wedge into the throat, whereby the lateral movement of the telescoping member is eliminated when the components are in a fully retracted position. Second, once the components are so wedged, the walls are bound together automatically by a minimum of one spring-loaded locking pin penetrating through registered apertures in the walls. Thus after coupling the hitch and trailer, the V-shaped structure will thereby permit a single backing movement of the towing vehicle to result in both the alignment and automatic locking of the components so that towing may begin.

It should be noted that the locking pin prevents the telescoping member and throat from separating, and, it must therefore resist sheer forces during towing. Hence, a safety pin is added which extends through registered openings in the telescoping member and the elongated rail. Thus, the pin helps indirectly transfer the towing forces between the throat and the telescoping member, through the rail and trunnion. This type of safety device is often mandated by government regulation for commercially available trailering mechanisms.

Accordingly, it is a principal object of the invention to provide a trailer hitch with an extensible and moveable throat that allows coupling of a stationary trailer socket with a towing hitch affixed to a stationary towing vehicle having been imprecisely aligned with the trailer.

It is another object of the invention to provide a trailer hitch which provides a telescoping and laterally swinging throat which can be manually positioned to couple a stationary trailer and a stationary towing vehicle which, when so coupled, is capable of self-aligning and automatically locking into a towing configuration by engagement of the walls of telescoping member with the walls of the throat.

It is a further object of the invention to provide a trailer hitch which automatically positions and secures the moveable throat of the hitch into a fixed towing position dependent upon the process of moving a towing vehicle and a trailer toward each other and allows the trailer to be safely towed without the need for a driver to exit the towing vehicle after backing.

Still another object of the invention is to provide a device which meets all governmentally set present standards for trailer hitches while performing its other stated objectives.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention relates to a ball and socket trailer hitch with a throat that is capable of automatically seating and locking a telescoping member capable of lateral swinging movement. The hitch allows a stationary towing vehicle having been. imprecisely aligned with a stationary trailer to be coupled without realigning either the trailer or towing vehicle, and then in one backing motion of the towing vehicle, automatically aligning and locking the hitch into a towing configuration.

Figure 1:
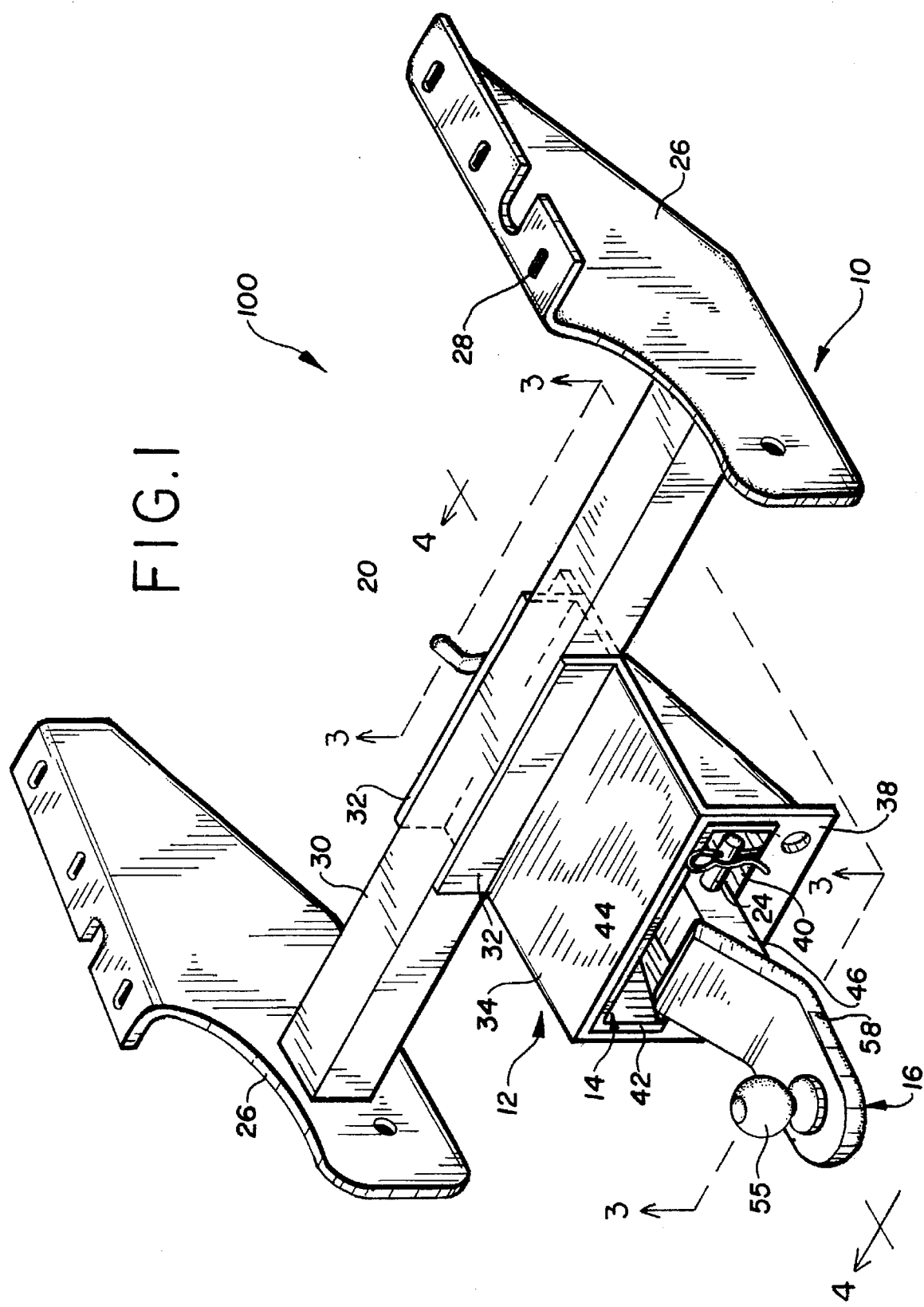
FIG. 1 is an isometric view of the preferred embodiment of the trailer hitch in its locked position.
Figure 3:
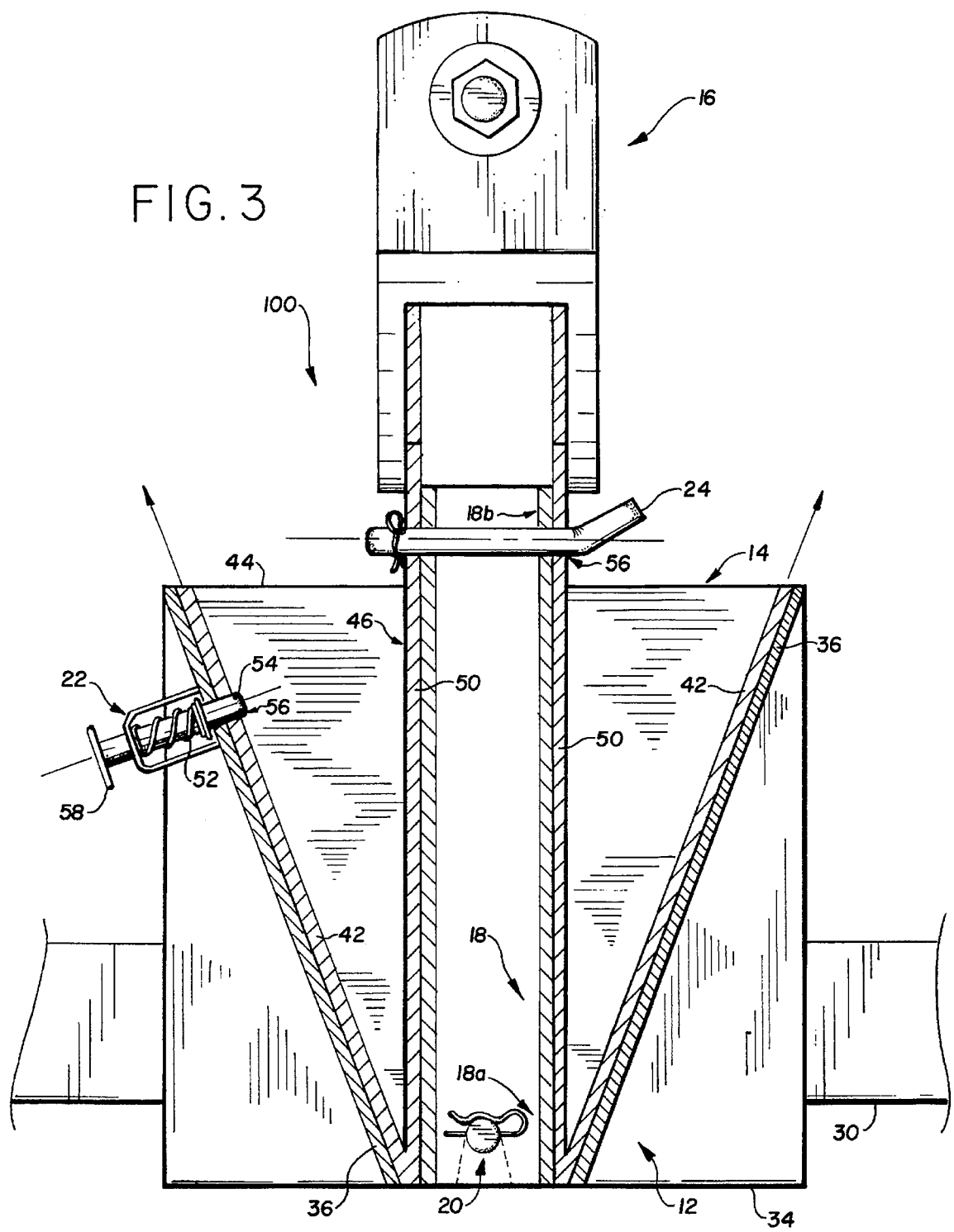
FIG. 3 is a cross sectional view of the trailer hitch as taken along line 3—3 in FIG. 1.
Figure 4:
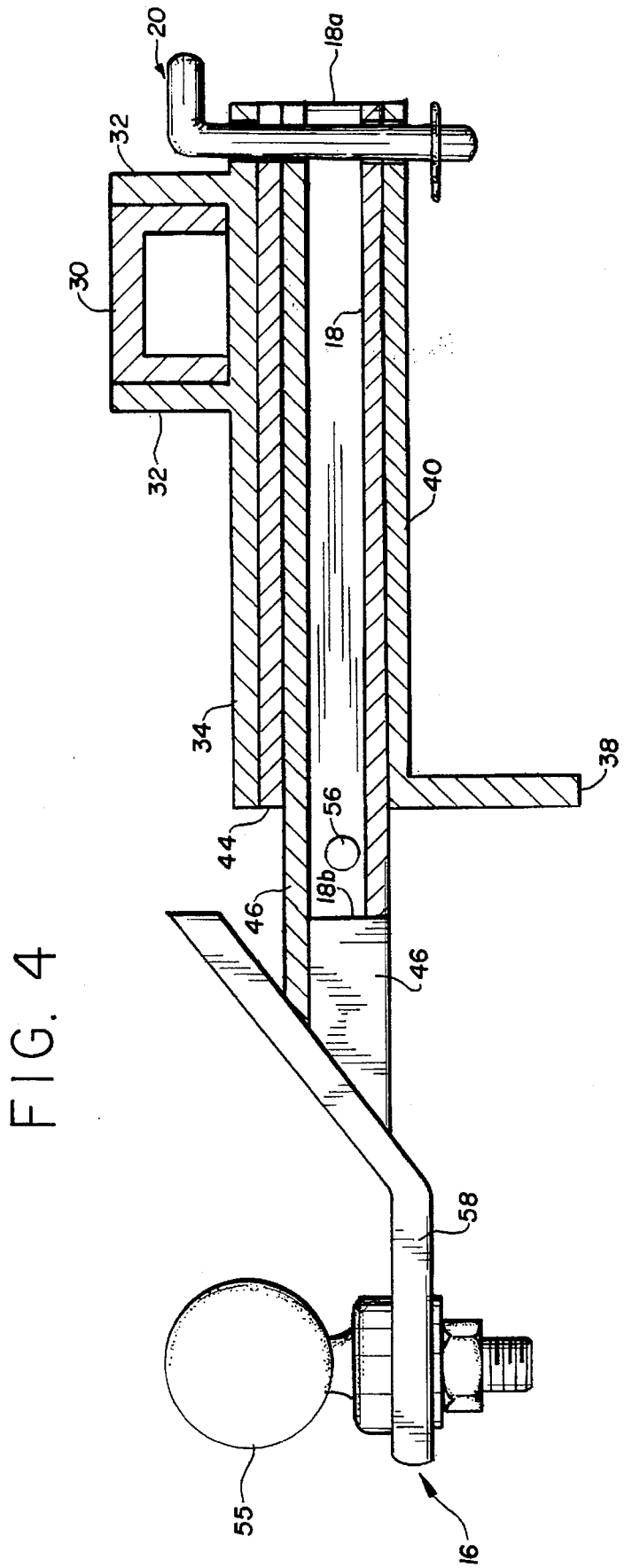
FIG. 4 is a cross-sectional view of the trailer hitch as taken along line 4—4 of FIG. 1.

Referring to FIGS. 1, 3, and 4, the preferred embodiment of the trailer hitch 100 is seen to be made up of several components, namely, a frame 10, a frusto-pyramidally shaped throat 12, a matingly frusto-pyramidally shaped telescoping member 14 to which a coupling structure 16 is affixed, an elongated rail 18 (as more clearly shown in FIG. 5), a trunnion 20 pivotally linking the rail 18 to the throat 12, a locking-pin assembly 22, and a safety pin 24.

As can be most easily be understood from FIG. 1, the frame 10 is capable of operatively securing the throat 12 to the chassis of a towing vehicle. The frame is made up of a pair of rigid brackets 26 through which openings 28 permit a fastener to be passed for operative attachment of the hitch to the towing vehicle. Each bracket 26 is mounted on the opposing ends of a transverse member 30, which is suited to the attachment of the throat 12 by a pair of flanges 32, whereby the throat is permanently affixed to a central location on the frame so that the opening of the throat may face in the rearward direction of the towing vehicle toward a trailer.

Figure 5:
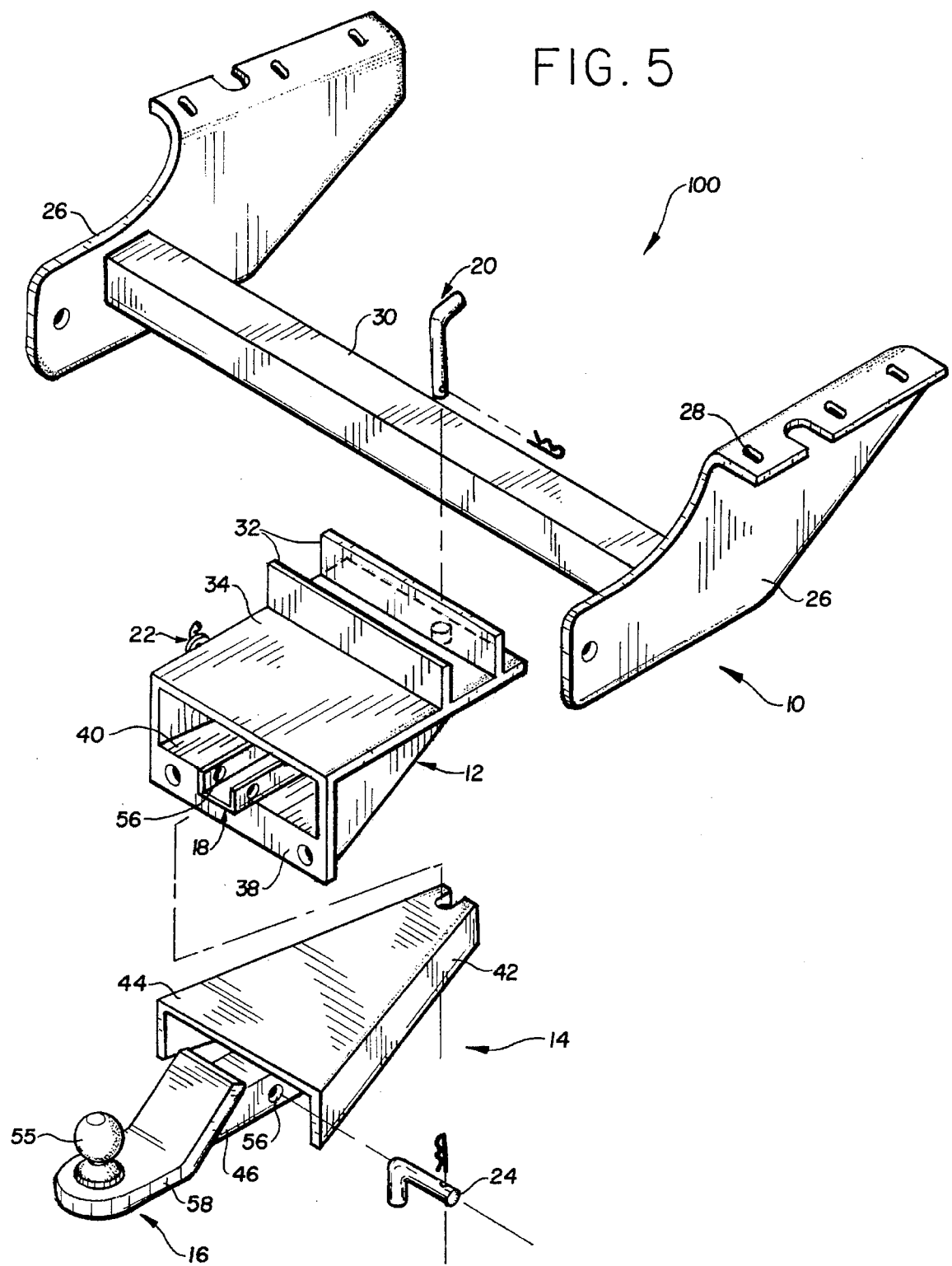
FIG. 5 is an exploded view of the trailer hitch.

Referring now to FIGS. 3, 4 and 5, the throat 12 is made up in part of a supporting plate 34 affixed to each of the pair of flanges 32. As can be best appreciated from FIG. 3, also affixed to the supporting plate 34 are a pair of walls 36 which, when extended to an imaginary intersection relative to one another, form an angle which corresponds to the angle of the walls of the telescoping member, as will be later discussed. The walls 36, the supporting plate 34 and a front plate 38 and bottom plate 40 are rigidly joined to create a rigid assembly forming the throat 12. A cavity is thus formed within the throat 12, which is shown having received an elongated rail 18. The elongated rail 18 has a U-shaped cross-section, the rail further having a first end 18a and a second end 18b, which first end is removably attached to a rear and narrowed portion of the throat 12 by a removable trunnion 20. The trunnion 20 passes through registered apertures 21 defined by the supporting plate 34 and bottom plate 40. The trunnion 20 permits the rail 18, which second end 18b extends beyond the throat opening, to pivot laterally within the confines of the throat 12.

The telescoping member 14 is made up of a pair of guide walls 42, a top plate 44 and a bar 46 of inverted U-shaped cross section ending in a coupling structure 16. Each guide wall 42 is rigidly affixed to the underside and each of a pair of opposite sides of the perimeter of the top plate 44. The assembly so formed is dimensioned and configured to form a wedge to be matingly received by the cavity formed by the throat 12 within the angle formed by the walls 36. The bar 46, having a cross-member 48 and two arms 50 which form the U-shaped cross-section, is rigidly affixed to the underside of the top plate 44 by the cross-member 48. The space formed between the arms of the inverted U-shaped bar 46 is shown matingly engaged with the rail 18, whereby the telescoping member 14 may ride on the rail 18.

As can be best appreciated from FIG. 3, when the telescoping member 14 is in its retracted and towing position, the guide walls 42 are in contiguous alignment with the walls 36 of the throat 12. Furthermore, the two arms 50 of the telescoping member 14 are also contiguously aligned with the rail 18. When locked, this configuration prevents all lateral movement by the telescoping member 14. However, this configuration does not prevent extension of the telescoping member 14 in the direction of the arrows as shown in FIG. 3. Therefore, a mechanism is need to lock the telescoping member 14 to the throat 12, accomplished in the preferred embodiment by a self-actuating, commonly available spring-loaded locking pin assembly 22.

As shown in FIG. 3, the locking pin assembly 22 is in its locked position, preventing extension of the telescoping member 14. To release the telescoping member 14 from the throat 12, a manual pulling on the thumb hold 58 of a bolt 54 of the pin assembly 22 will compress a spring 52 and retract the bolt 54 extending through registered openings 56 defined within the guide wall 42 and throat wall 36. The bolt 54 must clear the guide wall 42 to allow extension of the telescoping member 14 to occur. Once the telescoping member 14 has been extended, the pin assembly 22 may be released. Upon release, the spring 52 will partially decompress, so long as the bolt 54 rides on the surface of the guide wall while the registered openings 56 are not in registry.

Figure 2:
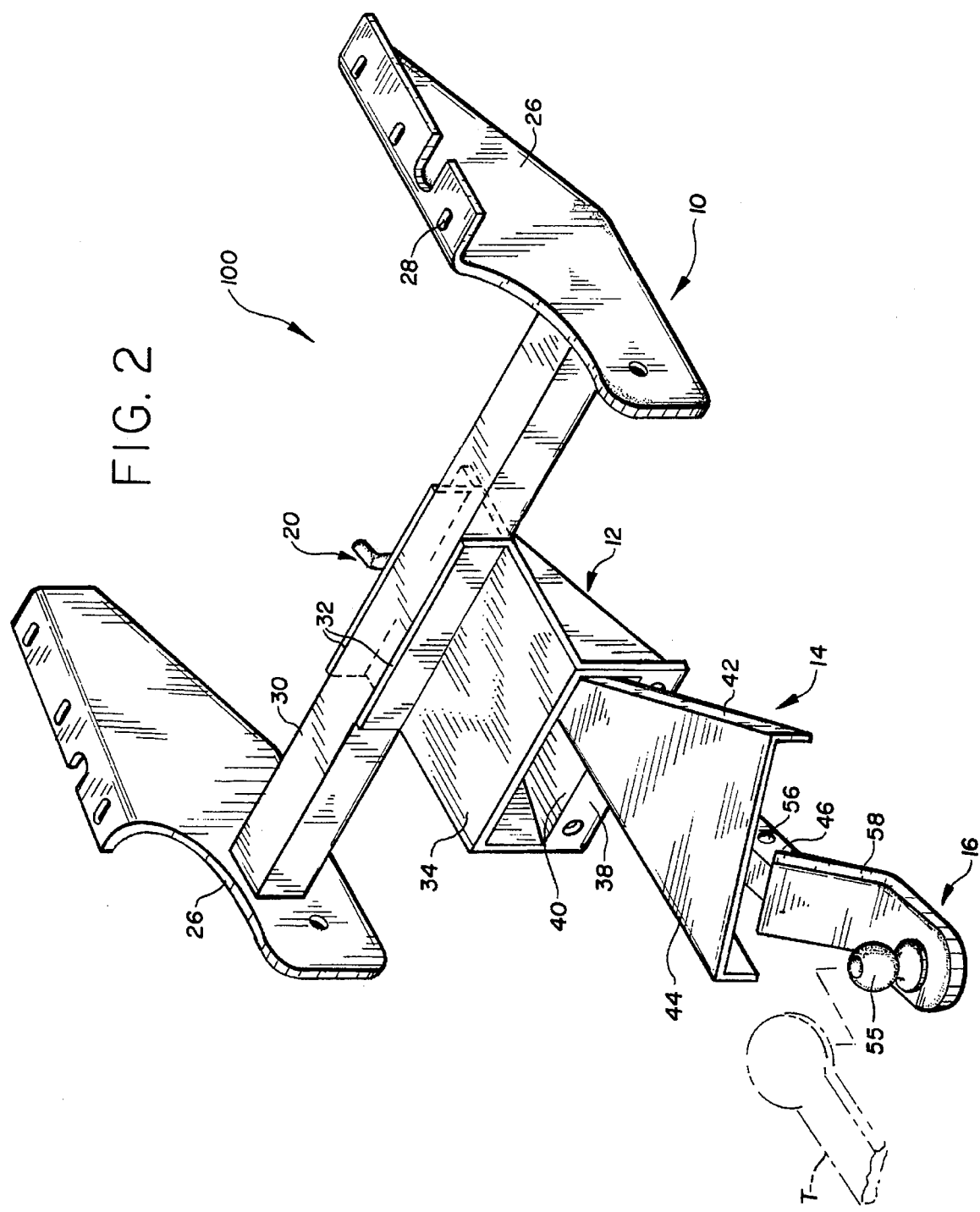
FIG. 2 is an isometric view of the trailer hitch in an extended swivel position.

Referring now to FIG. 2, the trailer hitch 100 is shown with the telescoping member 14 in an extended and pivoted position at a moment in time when the hitch is in close proximity to the trailer tongue T. Obviously, the coupling structure 16 may be made up of any device adapted to be received by the trailer receiving structure. As shown in each of the figures of the preferred embodiment a ball 55 and connecting shank 58 are shown affixed to the bar 46.

Upon coupling of the trailer to the trailer hitch 100, the process of backing the towing vehicle may be started. As the telescoping member 14 is forced into the throat 12 during the backing movement of the towing vehicle, the guide wall 42 and throat walls begin to align. Upon full retraction of the telescoping member 4 into the throat and upon registry of the registered openings 56, the bolt 54, having been retracted by the compression of the spring 52, will spring into place and lock hitch into a towing configuration.

As can be best appreciated from FIGS. 3, 4 and 5, registered openings 56 are also defined by the rail 8 and the bar 46, which registered openings 56 provide a passage for the insertion of a safety pin 24 when the telescoping member 14 is fully retracted into the cavity of the throat 12 and seated in a towing configuration. Nevertheless, the safety pin 24 is not necessary to the towing of the trailer because the rail 14 becomes automatically immovable upon being locked, being held in place by the bar 46 of the telescoping member 14. However, the safety pin 24 presence is necessary to meet government safety specifications.

It is to be understood that the present invention is not limited to the embodiment described above, but encompasses any and all embodiments within the scope of the following claims.

I claim:

1. A trailer hitch comprising:
   a frame, suited for operative attachment to a towing vehicle,
   a throat, having a forward and a rearward end, operatively affixed to said frame and defining a cavity with an opening at the rearward end, whereby the rearward end may face a vehicle to be towed,
   an elongated glide means, having a forward end and a rearward end, said forward end operably mounted within said throat cavity for lateral movement of the rearward end, said elongated glide means being a U-shaped rail;
   a telescoping member having a forward and a rearward end, said forward end adapted to matingly engage said throat and adapted to matingly engage said glide means, and adapted for selected operative securement to a vehicle to be towed; and
   a locking pin assembly including a movable pin which is biased toward engagement with said telescoping member so as to lock said telescoping member in place into a predefined orientation of the telescoping member, whereby the trailer hitch is made ready to tow the vehicle to be towed.

2. The trailer hitch according to claim 1, wherein the throat further comprises at least two walls and a supporting plate, said at least two walls being configured relative to one another at a predefined angle and affixed to said supporting plate, thereby defining a frusto-pyramidally shaped cavity within said throat.

3. The trailer hitch according to claim 2, wherein at least one wall of said at least two walls includes at least one recess defined therein, said moveable pin being biased toward engagement with said at least one wall for selected travel therealong, said at least one recess being configured for capture of said movable pin upon passage of said movable pin thereover.

4. The trailer hitch according to claim 1, wherein said telescoping member further comprises a plate and at least two guide walls configured to one another at predefined angle, thereby defining a frusto-pyramidally shaped wedge matingly configured to said frusto-pyramidally shaped cavity of said throat.

5. The trailer hitch according to claim 1, further comprising a trunnion operably linking said glide means and said throat.

6. The trailer hitch according to claim 5, wherein said trunnion further comprises a removable pin, a first opening defined by said glide means dimensioned and configured to allow close passage of said removable pin, and a second aperture defined by the throat dimensioned and configured to allow close passage of said removable pin, said first aperture and said second aperture capable of being placed into registry.

7. The trailer hitch according to claim 1, further comprising a removable safety pin, a first aperture defined by said glide means dimensioned and configured to allow close passage of said safety pin, and a second aperture defined by the telescoping member dimensioned and configured to allow close passage of said safety pin, said first aperture and said second aperture capable of being placed into registry.

8. The trailer hitch according to claim 1, wherein said telescoping member is further comprised of a coupling structure adapted to be received by a trailer receiving structure.

9. A trailer hitch comprising:
- a frame, suited for operative attachment to a towing vehicle,
- a throat, having a forward and a rearward end, operatively affixed to said frame and defining a cavity with an opening at the rearward end, whereby the rearward end may face a vehicle to be towed, said throat further including at least two walls and a supporting plate, said at least two walls being configured relative to one another at a predefined angle and affixed to said supporting plate, thereby defining a frusto-pyramidally shaped cavity within said throat, at least one wall of said at least two walls including at least one recess defined therein;
- an elongated glide means, having a forward end and a rearward end, said forward end operably mounted within said throat cavity for lateral movement of the rearward end;
- a telescoping member having a forward and a rearward end, said forward end adapted to matingly engage said throat and adapted to matingly engage said glide means, and adapted for selected operative securement to a vehicle to be towed; and
- a locking pin assembly including a movable pin which is biased toward engagement with said telescoping member so as to lock said telescoping member in place into a predefined orientation of the telescoping member, said moveable pin being biased toward engagement with said at least one wall for selected trawl therealong, said at least one recess being configured for capture of said movable pin upon passage of said movable pin thereover, whereby the trailer hitch is made ready to tow the vehicle to be towed.

* * * * *